United States Patent [19]

Kelley

[11] Patent Number: 5,468,290
[45] Date of Patent: Nov. 21, 1995

[54] CERAMIC ADHESIVE

[75] Inventor: Kurtis C. Kelley, Washington, Ill.

[73] Assignee: Caterpillar Inc., Peoria, Ill.

[21] Appl. No.: 282,354

[22] Filed: Jul. 29, 1994

[51] Int. Cl.$^6$ .................................................. C04B 28/26
[52] U.S. Cl. ........................ 106/635; 156/325; 501/103; 501/108; 501/127; 501/154
[58] Field of Search ..................... 106/602, 605, 106/635; 501/89, 103, 108, 127, 95, 153, 154; 156/325

[56] References Cited

U.S. PATENT DOCUMENTS

| | | | |
|---|---|---|---|
| 2,114,166 | 4/1938 | De Leeuw | 106/635 |
| 4,231,800 | 11/1980 | Holt et al. | 106/58 |
| 4,981,511 | 1/1991 | Schmidberger et al. | 501/95 |
| 5,006,423 | 4/1991 | Draskovich | 428/698 |
| 5,108,963 | 4/1992 | Fu et al. | 501/89 |

*Primary Examiner*—Mark L. Bell
*Assistant Examiner*—Michael Marcheschi
*Attorney, Agent, or Firm*—Pankaj Khosla

[57] ABSTRACT

A ceramic adhesive comprises a ceramic matrix formed from a mixture of a metallic oxide and an alkali silicate in water, and silicon carbide whiskers dispersed within the ceramic matrix. Further, a ceramic adhesive comprises a ceramic matrix formed from a mixture of magnesium oxide in the range of about 50% to about 80% by weight and sodium silicate in water in the range of about 50% to about 20% by weight, and silicon carbide whiskers dispersed within said ceramic matrix, the whiskers being in the range of about 3% to about 25% by weight of the ceramic matrix. A ceramic adhesive of the present invention is particularly useful in mounting and bonding in-cylinder sensors to steel internal engine parts.

22 Claims, No Drawings

CERAMIC ADHESIVE

TECHNICAL FIELD

The present invention relates to a ceramic adhesive, and more particularly to a high temperature, abrasion resistant ceramic adhesive reinforced with silicon carbide whiskers.

BACKGROUND ART

Ceramic adhesives have properties such as good mechanical strength and high temperature stability, making them suitable for high technology applications. However, higher porosity and lower fracture toughness than desirable are some of the limitations of ceramic adhesives. Hence, recent work in this field has been directed to the development of tougher and more reliable ceramic adhesive materials.

In the past, ceramic adhesives have been used in various high temperature applications. However, most of these applications have been of a nature where the ceramic adhesive has been subjected mainly to thermal stresses, and not a combination of thermal and mechanical stresses, chemically corrosive environment and abrasive wear. U.S. Pat. No. 5,006,423 issued Apr. 9, 1991 to Draskovich, discloses a refractory cement formed from a mixture of sodium silicate in water and a ceramic powder, such as silicon nitride, silicon carbide or silicon dioxide. Draskovich provides this refractory cement for bonding metallic instrumentation to ceramic components of a gas turbine engine, for use at temperatures below about 2500° F. Draskovich does not solve the problem of bonding metallic instrumentation to metallic parts, where the ceramic adhesive must be durable and long-lasting, in spite of the differences in thermal coefficient of expansion and thermal conductivity, between the metallic instrumentation, the ceramic adhesive and the metallic component.

It has been known that ceramic composites can be reinforced by using fibers. It is also known that silicon carbide fibers toughen the material through the mechanisms of crack deflection and fiber pullout. However, silicon carbide fibers tend to soften at temperatures of about 850° C. and lose their toughening effect. Several inventors have discovered the advantages of using silicon carbide whiskers (SiC whiskers) in ceramic compositions. U.S. Pat. No. 5,108,963 issued Apr. 28, 1992 to Fu et. al, discloses a SiC whiskers reinforced alumina based ceramic composite which shows improved mechanical properties and sinterability through the addition of chromia. However, this ceramic does not have any adhesive properties. Further, it requires a sintering temperature of about 1350° C. Such a high temperature destroys the sensor mounted in the engine part.

U.S. Pat. No. 4,231,800 issued Nov. 4, 1980 to Holt et. al, discloses a dry heat setting refractory for securing nozzles to nozzle blocks in steel pour ladles. Holt discloses a refractory composition comprising magnesite and hydrated sodium silicate in a weight ratio in the range of 94:6 to 98:2. Holt preferably uses hydrated sodium silicate so that the refractory material is dry and a bond is formed when hot steel engages the dry refractory. Although the type of ceramic adhesive disclosed by Holt may be suitable for bonding nozzles to nozzle blocks in steel pour ladles, it has been found to be not useful in mounting and bonding instrumentation on components inside an internal combustion engine. For example, an adhesive used for mounting a motion sensor in a piston-ring groove, is subjected to temperatures in the range of about 500°–600° C., combustion gases and lubricant flow. All of these work together to create a tribological wear environment that eventually erodes the adhesive and destroys the bond between the instrumentation and the engine component.

In the present invention, it has been found that a ceramic adhesive formed from a mixture of an alkali silicate in water and magnesium oxide, can be substantially toughened by the addition of silicon carbide (SIC) whiskers. Further, because this ceramic adhesive is cured at low temperatures, it is believed that there is no chemical bonding of the whiskers with the ceramic matrix. Hence, the desirable properties imparted by the SiC whiskers, like impeding crack propagation through mechanisms such as crack bridging, crack deflection and whisker pullout, are exploited to impart a combination of good mechanical, thermal, chemical and abrasion resistance properties to the ceramic adhesive.

It is also known to bond sensors to components by means of other adhesives, such as organic epoxy glues. Epoxy glues have good bonding characteristics, but they are limited to temperatures below about 260° C. It has been also discovered that an epoxy can be used to seal the porosity of a ceramic adhesive, resulting in an overall improvement in the mechanical, thermal, chemical and abrasion resistance properties of the sealed ceramic adhesive.

It is desirable to have a tough ceramic adhesive for bonding instrumentation such as ring motion sensors, pressure sensors, thermocouples, and liner gap sensors, on engine components such as cylinder walls and pistons, that can withstand thermal and mechanical stresses, and the deleterious effect of combustion gases, engine lubricants and abrasive wear. The present invention is directed to overcome one or more of the problems as set forth above.

DISCLOSURE OF THE INVENTION

In one aspect of the invention, a ceramic adhesive comprises a ceramic matrix formed from a mixture of a metallic oxide and an alkali silicate in water, and silicon carbide whiskers dispersed within the ceramic matrix.

In another aspect of the invention, a ceramic adhesive comprises a ceramic matrix formed from a mixture of magnesium oxide in the range of about 50% to about 80% by weight and sodium silicate in water in the range of about 50% to about 20% by weight, and silicon carbide whiskers dispersed within said ceramic matrix, the whiskers being in the range of about 3% to about 25% by weight of the ceramic matrix.

A ceramic adhesive of the present invention is particularly useful in mounting and bonding in-cylinder sensors to steel internal engine parts.

BEST MODE FOR CARRYING OUT THE INVENTION

In the preferred embodiment of the present invention, the metallic oxide used is magnesium oxide. The bulk density of magnesium oxide powder is desirably in the range of 1.90 gms/cc and 1.99 gms/cc, and preferably, about 1.94 gms/cc. The particle size of the magnesium oxide powder is desirably within the range of 0.1 µm to 20 µm, and preferably within the range of 0.3 µm to 3.0 µm. Even more preferably, at least 70% of the magnesium oxide powder should have a particle size of about 0.7 µm and the balance within the range of about 0.3 µm to 0.7 µm. A homogeneously uniform particle size of MgO is useful in attaining a dense microstructure and a grain size within the range of about 0.1 µm to 1.0 µm in the ceramic adhesive matrix. It has been found that a fine grain microstructure densifies the adhesive, reduces its porosity and improves the bond between the sensor and the engine component.

Other examples of metallic oxides that may alternatively be used are aluminum oxide ($Al_2O_3$), silicon dioxide ($SiO_2$), zirconium oxide ($ZrO_2$) and other suitable equivalents. However, magnesium oxide (MgO) is preferred because it has been found that by using MgO, the resultant ceramic adhesive has a coefficient of thermal expansion very close to that of steel, i.e., about 10 µm/m.°K. It is desirable that the ceramic adhesive have a coefficient of thermal expansion in the range of about 10 µm/m.°K. to 14 µm/m.°K., and preferably, about 12 µm/m.°K., to minimize the thermal stresses caused by the thermal expansion and contraction of the steel engine component, the sensor, and the ceramic adhesive. Hence, $Al_2O_3$, $SiO_2$ and $ZrO_2$ may be used as alternatives to MgO but it should be noted that magnesia has a higher thermal conductivity than alumina, silica and zirconia and thus, the choice of an alternative should be based on the desired coefficient of thermal expansion of the ceramic adhesive and coefficient of thermal expansion of the metal that the engine component is made from. The magnesium oxide powder used for carrying out an embodiment of the present invention has a trade name "Ceramabond 571 powder", is manufactured by Aremco Products, Inc., and has a particle size distribution such that about 30% of the powder has a particle size of about 20 µm, and about 70% of the powder has a particle size within the range of about 1 µm to 10 µm.

The term "alkali silicate in water", as used herein means a compound having a formula: $(Na_2O)_x.(SiO_2)_y.(H_2O)_z$ or $(K_2O)_x.(SiO_2)_y.(H_2O)_z$, where the ratio of y:x is in the range of about 2.8:1 to about 3.6:1 by weight and the ratio of z:(x+y) is in the range of about 0.3:1.0 to 0.5:1.0 by weight.

In the preferred embodiment of the present invention, the alkali silicate used is sodium silicate in water, i.e., water glass, having the formula $(Na_2O)_x.(SiO_2)_y.(H_2O)_z$. The water content of sodium silicate in water is desirably within the range of about 30% to 50%, and preferably, about 40% by weight. The ratio of silica to soda is desirably within the range of about 2.8:1 to 3.6:1, and preferably within the range of 3.1:1 to 3.3:1. The viscosity of sodium silicate in water is desirably within the range of about 300 centipoise to 800 centipoise, and preferably about 550 centipoise. The specific gravity of sodium silicate in water is desirably within the range of about 1.37 to 1.42, and preferably, about 1.39. Another example of a suitable alternative alkali silicate is potassium silicate. The sodium silicate used for carrying out an embodiment of the present invention has a trade name "Ceramabond 571 liquid", is manufactured by Aremco Products, Inc., and has a viscosity of about 500 centipoise, a specific gravity of about 1.395 and a water content of about 35%.

In the preferred embodiment of the present invention, the length of the silicon carbide whiskers is desirably within the range of about 10 µm to 150 µm, and preferably, about 125 µm. The diameter of the whiskers is desirably within the range of about 0.1 µm to 1.0 µm, and preferably, about 0.3 µm. The length to diameter ratio is desirably within the range of about 200 to 600, and preferably, about 416. It has been discovered that the dispersion of SiC whiskers within the adhesive matrix imparts toughness to the adhesive and significantly improves the durability of the adhesive, when exposed to the severe environment inside a combustion engine.

In the below described illustrative Examples A, B and C, sample 1, a ceramic adhesive having SiC whiskers, and used for carrying out an embodiment of the present invention, was formed in the following manner: Ceramabond 571 powder (magnesium oxide) and SiC whiskers were mixed in a ball mill to form a powder mix, such that the whiskers comprised about 15% by weight of said powder mix. To 2 parts by weight of said powder mix, 1 part by weight of Ceramabond 571 liquid (sodium silicate in water) was added, resulting in a viscous slurry of a wet adhesive mixture having the composition by weight %:

| | |
|---|---|
| magnesium oxide | 56.67 |
| sodium silicate in water | 33.33 |
| silicon carbide whiskers | 10.00 |

In the below described illustrative Examples A, B and C, sample 2, a ceramic adhesive without any SiC whiskers, was formed in the following manner: 2 parts by weight of Ceramabond 571 powder (magnesium oxide) were mixed with 1 part by weight of Ceramabond 571 liquid (sodium silicate in water), resulting in a viscous slurry of a wet adhesive mixture having the composition by weight %:

| | |
|---|---|
| magnesium oxide | 66.67 |
| sodium silicate in water | 33.33 |

In the below described illustrative Examples A, B and C, the ceramic adhesives of samples 1 and 2 were both cured in the following manner: the wet ceramic adhesive slurry was dried by placing inside an oven at about 50° C. and increasing the temperature of the oven from 50° C. to 94° C. over a period of about 24 hours. Thereafter, the ceramic adhesive was cured by increasing the temperature from 94° C. to 105° C. over a period of 16 hours, and further increasing the temperature from 105° C. to 260° C. over a period of about 8 hours. The temperature was held constant at about 260° C. for about 2 hours and after that, the cured adhesive was allowed to cool down to room temperature. It is of extreme importance that in the curing cycle, the temperature is gradually raised as described above, or else bubbling of the adhesive will occur.

For all the test samples in the below described illustrative Examples, the coefficient of thermal expansion was measured by a Theta Pushrod Recording Dilatometer in a temperature range of from room temperature to about 1000° C. and the porosity was measured by a Mercury Porosimeter. These techniques are well known to a person having an ordinary skill in the art.

EXAMPLE A

Samples 1 and 2 were formed and cured in the manner described above. Several specimens of both samples were formed in the shape of bars, having a length of about 4 inches and a diameter of about 1". After curing, both adhesive samples were heat aged for a period of about 8 hours in an oven heated to a temperature of about 343° C. After this heat aging, both samples were removed from the oven and examined for any appearance of any spontaneous brittle fracture. Then, both adhesive samples were struck with a 5 lb. hammer to examine whether the adhesive cracked. The following observations were made:

| Sample 1 | No spontaneous cracks |
| --- | --- |
| | Sample did not break |
| Sample 2 | Several spontaneous cracks |
| | Sample broke and became powdery |

It can be seen that sample 1, which had SiC whiskers, had substantially better fracture toughness after heat ageing than sample 2, which had no SiC whiskers.

EXAMPLE B

The ceramic adhesives of sample 1 and sample 2 were tested in a diesel engine environment. A ring motion sensor was installed in the top piston ring groove of a steel piston. This was done by drilling bores having a diameter of about 2 mm, in the piston ring groove, said bores defining a circular passage extending from the circumference of the piston ring groove to the back side (the oil gallery side) of the piston. The sensor and the sensor wires were encapsulated in the ceramic adhesives of sample 1 and 2 and positioned inside the bores. The adhesives were cured as described above and the entire assembly, comprising the piston and the ring motion sensor and wire, bonded in place by the adhesives of samples 1 and 2, was installed in a diesel engine. The engine was run on a test bench for a period of about 10 hours. The sensors was examined at the end of the run and the following observations were made:

| Sample 1 | Sensor somewhat loose, adhesive looks good |
| --- | --- |
| Sample 2 | Sensor loose, adhesive appears cracked and brittle |

EXAMPLE C

The coefficient of thermal expansion, specific gravity and porosity of samples 1 and 2 were measured and found to be as follows:

| | Sample 1 | Sample 2 |
| --- | --- | --- |
| Coeff. of thermal exp., μm/m. °K. | 10 | 10 |
| Specific gravity | 2.11 | 2.34 |
| % Porosity | 33 | 26 |
| Avg. pore diameter, μm | 0.0726 | 0.188 |
| Median pore diameter, μm | 0.0047 | 0.0044 |

It was observed that the bond integrity of the sensor bonded with sample 1 was better than sample 2 in an actual engine environment. It is believed that sample 1 performed better due to its higher thermal conductivity as compared to sample 2. Because sample 1 has SiC whiskers dispersed in the ceramic matrix and because the SiC whiskers have a thermal conductivity about twice that of the ceramic matrix, it is believed that sample 1 has a higher thermal conductivity than sample 2. The coefficient of thermal expansion of steel is about 12 μm/m.°K., while that of sample 1 and sample 2 is about 10 μm/m.°K. It is believed that the SiC whiskers improve the fracture toughness of the ceramic adhesive. This is because although the porosity of sample 1 is somewhat higher than sample 2, the average pore diameter of sample 1 is less than 40% of that of sample 2. Thus sample 1 has a more uniform pore microstructure and a finer grain size.

In summary, the ceramic adhesive embodying the present invention has improved thermal conductivity, coefficient of thermal expansion and fracture toughness over conventional ceramic adhesives. This results in a ceramic adhesive having thermal properties similar to steel. This reduces thermal stresses due to differences in expansion rates and temperature gradients.

Industrial Applicability

A ceramic adhesive of the present invention is particularly useful in mounting and bonding in-cylinder sensors to steel internal engine parts. Such sensors are typically used to measure temperature, pressure, acceleration, piston ring motion and piston ring to cylinder liner gap, in engines being tested during research and development. The ceramic adhesive described herein is especially useful in encapsulating a sensor and retaining it within a small bore in a piston ring groove by maintaining a firm bond between the sensor and the steel substrate.

Further, the ceramic adhesive described herein has good resistance to fracture and abrasion and has a thermal conductivity and coefficient of thermal expansion similar to steel, resulting in lower thermal stresses. Hence, the sensors mounted by using this ceramic adhesive will stay in place longer.

Other aspects, objects and advantages of this invention can be obtained from a study of the disclosure and the appended claims.

I claim:

1. A ceramic adhesive, comprising:

a ceramic matrix, said ceramic matrix being formed from a mixture of a metallic oxide and an alkali silicate in water; and silicon carbide whiskers dispersed within said ceramic matrix;

wherein said ceramic matrix is formed from a mixture, comprising, in the range of about 50% to about 80% by weight metallic oxide and in the range of about 50% to about 20% by weight alkali silicate in water, and said silicon carbide whiskers being present in the range of about 3% to about 25% by weight of said ceramic matrix; and wherein said metallic oxide is selected from a group consisting of magnesium oxide, aluminum oxide, zirconium oxide, silicon dioxide and mixtures thereof.

2. A ceramic adhesive, as set forth in claim 1, wherein said ceramic matrix is formed from a mixture, comprising, about 63% by weight metallic oxide and from about 37% by weight alkali silicate in water, and said silicon carbide whiskers being present in about 10% by weight of said ceramic matrix.

3. A ceramic adhesive, as set forth in claim 1, wherein said metallic oxide is selected from the group consisting of aluminum oxide, silicon dioxide, zirconium oxide and mixtures thereof.

4. A ceramic adhesive, as set forth in claim 3, wherein said metallic oxide has a particle size in the range of about 0.1 μm to 20 μm.

5. A ceramic adhesive, as set forth in claim 1, wherein said alkali silicate in water is selected from the group consisting of sodium silicate in water and potassium silicate in water and mixtures thereof.

6. A ceramic adhesive as set forth in claim 5, wherein said alkali silicate in water has a specific gravity in the range of about 1.37 to 1.42.

7. A ceramic adhesive, as set forth in claim 5, wherein said alkali silicate in water has a viscosity in the range of about 300 centipoise to 800 centipoise.

8. A ceramic adhesive, as set forth in claim 5, wherein said alkali silicate in water is sodium silicate in water.

9. A ceramic adhesive, as set forth in claim 8, wherein said sodium silicate in water has a specific gravity in the range of about 1.37 to 1.42 and a viscosity in the range of about 300 centipoise to 800 centipoise.

10. A ceramic adhesive, as set forth in claim 8, wherein said sodium silicate in water has the formula $(Na_2O)_x \cdot (SiO_2)_y \cdot (H_2O)_z$, the ratio of y:x is in the range of about 2.8:1 to about 3.6:1 by weight and the ratio of z:(x+y) is in the range of about 0.3:1.0 to 0.5:1.0 by weight.

11. A ceramic adhesive, as set forth in claim 10, wherein the ratio of y:x is about 3.3:1 by weight and the ratio of z:(x+y) is about 0.4:1 by weight.

12. A ceramic adhesive, as set forth in claim 1, wherein said silicon carbide whiskers have a length in the range of about 10 µm to 150 µm, a diameter in the range of about 0.1 µm to 1.0 µm, and a length to diameter ratio in the range of about 200 to 600.

13. A ceramic adhesive, as set forth in claim 12, wherein said silicon carbide whiskers have a length of about 125 µm, a diameter of about 0.3 µm, and a length to diameter ratio of about 416.

14. A ceramic adhesive, as set forth in claim 1, Wherein said ceramic adhesive has a coefficient of thermal expansion in the range of about 9 µm/m.°K to 14 µm/m.°K.

15. A ceramic adhesive, as set forth in claim 1, wherein said ceramic adhesive has a porosity less than about 40%.

16. A ceramic adhesive, as set forth in claim 1, wherein said ceramic adhesive has an average pore diameter in the range of 0.05 µm to 0.10 µm.

17. A ceramic adhesive, comprising:
a ceramic matrix, said ceramic matrix being formed from a mixture, comprising, in the range of about 50% to about 80% by weight magnesium oxide and in the range of about 50% to about 20% by weight sodium silicate in water; and silicon carbide whiskers being dispersed within said ceramic matrix, said whiskers being in the range of about 3% to about 25% by weight of said ceramic matrix.

18. A ceramic adhesive, as set forth in claim 17, wherein said magnesium oxide has a particle size in the range of about 0.1 µm to 20 µm.

19. A ceramic adhesive, as set forth in claim 18, wherein said magnesium oxide has a particle diameter in the range of about 0.3 µm to 3.0 µm.

20. A ceramic adhesive, as set forth in claim 17, wherein said sodium silicate in water has a specific gravity in the range of about 1.37 to 1.42 and a viscosity in the range of about 330 centipoise to 760 centipoise.

21. A ceramic adhesive, as set forth in claim 17, wherein said silicon carbide whiskers have a length in the range of about 10 µm to 150 µm, a diameter in the range of about 0.1 µm to 1.0 µm, and a length to diameter ratio in the range of about 200 to 600.

22. A ceramic adhesive, as set forth in claim 17, wherein said ceramic adhesive has a porosity less than about 40%, and an average pore diameter in the range of 0.05 µm to 0.10 µm.

* * * * *